United States Patent [19]

Kittrell et al.

[11] 4,122,156
[45] Oct. 24, 1978

[54] PROCESS FOR THE PRODUCTION OF CARBON DISULFIDE FROM SULFUR DIOXIDE REMOVED FROM A FLUE GAS

[75] Inventors: James R. Kittrell, Amherst, Mass.; Charles W. Quinlan, Houston, Tex.

[73] Assignees: New England Power Company, Westborough, Mass.; Northeast Utilities Service Company, Newington, Conn.

[21] Appl. No.: 824,186

[22] Filed: Aug. 12, 1977

Related U.S. Application Data

[63] Continuation of Ser. No. 604,091, Aug. 13, 1975, abandoned.

[51] Int. Cl.² ............................................. C01B 31/26
[52] U.S. Cl. .................................. 423/443; 423/416; 423/570
[58] Field of Search ............... 423/443, 570, 416, 244, 423/242

[56] References Cited

PUBLICATIONS

Pearson, "Catalysts for Claus Process", Kaiser Aluminum & Chemical Corporation, Center for Technology, (Oct. 1972).
Goetz et al., "Catalyst Evaluation for The Simultaneous Reduction of Sulfur Dioxide and Nitric Oxide by Carbon Monoxide," Industrial Engineering Chemistry Process Design Development, vol. 13, No. 2 (1974).

Primary Examiner—O. R. Vertiz
Assistant Examiner—Wayne A. Langel
Attorney, Agent, or Firm—Thompson, Birch, Gauthier & Samuels

[57] ABSTRACT

A process for the recovery of carbon disulfide from a flue gas. A stream of sulfur dioxide is removed from a flue gas and introduced into a first reduction reactor containing a chromium promoted iron oxide catalyst where the sulfur dioxide is reduced to carbonyl sulfide. The carbonyl sulfide is introduced into a second reduction reactor which contains an active alumina catalyst. The carbonyl sulfide decomposes to carbon disulfide which is recovered.

4 Claims, 1 Drawing Figure

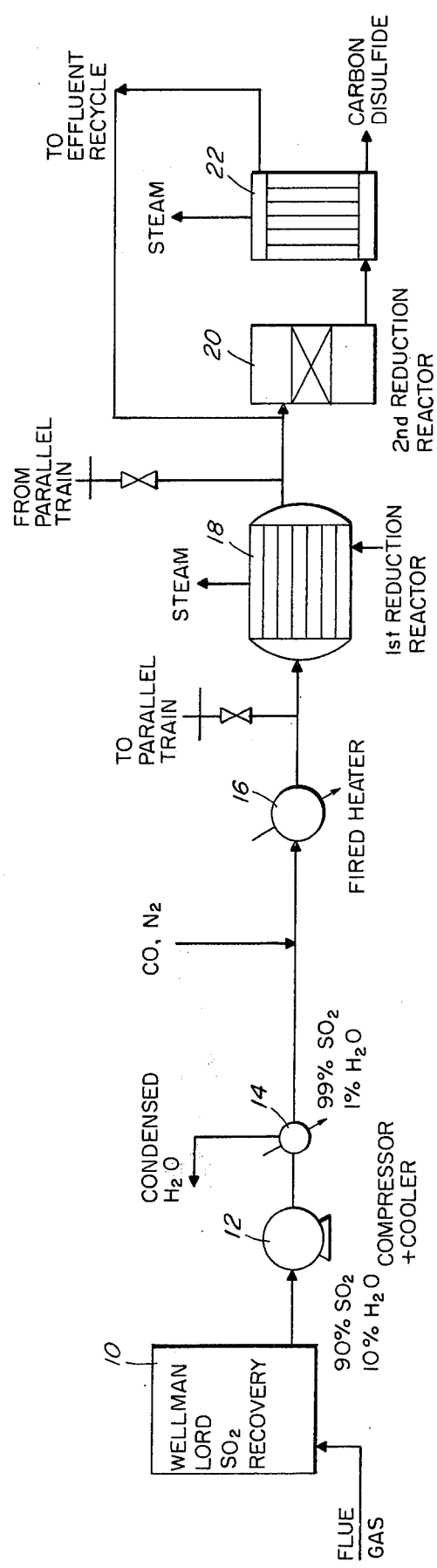

PROCESS FOR THE PRODUCTION OF CARBON DISULFIDE FROM SULFUR DIOXIDE REMOVED FROM A FLUE GAS

This is a continuation, of application Ser. No. 604,091 filed Aug. 13, 1975, now abandoned.

BACKGROUND OF THE INVENTION

Sulfur dioxide and nitric oxide are two of the major contributors to air pollution in many of the industrial areas of the world today. A variety of approaches have been taken to reduce power plant emission levels of sulfur dioxide and nitric oxide. For a summary of the processes considered commercially feasible to remove sulfur dioxide from a flue gas see CEP Vol. 71, No. 5, pgs. 55-71.

In the direct treatment of the flue gas by catalytic reduction, the major problems encountered are the formation of hydrogen sulfide with water-containing streams and the reformation of sulfur dioxide with oxygen-containing streams. In particular, with the water-containing streams, it is generally found that hydrogen sulfide formation occurs with all catalysts presently available, including copper on alumina.

With oxygen levels greater than 0.5%, there is a noticeable decline in sulfur dioxide removal when sulfur dioxide is reduced with carbon monoxide. Further, the carbonyl sulfide which is present in the reduction sequence for sulfur dioxide can be reoxidized to sulfur dioxide and carbon dioxide. Oxygen also reacts with hydrogen sulfide as well as carbonyl sulfide and thus sulfur dioxide is reformed and removal efficiency declines whether water and/or oxygen as present in the stream to be treated.

The removal of sulfur dioxide per se from a flue gas stream and its subsequent catalytic reduction to elemental sulfur is well known; see U.S. Pat. No. 3,495,941, Van Helden; U.S. Pat. No. 3,615,231, Cullom; and U.S. Pat. No. 3,764,665, Groenendaal. Methane reduction of sulfur dioxide combined with a two-stage Claus process has been employed by Allied Chemical Company. Sulfur removal before and between the stages of the Claus unit is employed due to thermodynamic limitations and to prevent combinations of the sulfur on the Claus catalyst.

Sequential reduction of sulfur dioxide, including forming carbonyl sulfide in a first stage and reacting sulfur dioxide with carbonyl sulfide in a second stage has been broadly shown; see U.S. Pat. No. 1,710,141, Benner et al; and U.S. Pat. No. 2,213,787, Von Girsewald. These prior art processes generally do not account for the formation of reaction products which then have to be separately treated and/or they do not use a simple and economical manner for processing sulfur dioxide in a flue gas to elemental sulfur. More importantly, the processes do not teach the formation of carbon disulfide. Processes for the manufacture of carbon disulfide are also well known; see U.S. Pat. Nos. 3,568,121; 2,935,380; 2,767,058; and 2,767,059. However, these processes are not directed to the formation of carbon disulfide from sulfur dioxide which has been removed from a flue gas.

SUMMARY OF THE INVENTION

The invention is directed to a method for the removal of sulfur dioxide from a flue gas stream and a dual bed catalyst system to convert the removed sulfur dioxide to carbon disulfide.

In one embodiment of the invention, a flue gas containing sulfur dioxide is treated in a first reduction reactor to reduce the sulfur dioxide to carbonyl sulfide. The carbonyl sulfide enters a second reduction reactor and is decomposed to form carbon disulfide. The catalyst in the first reduction reactor effects substantially complete conversion of the sulfur dioxide to carbonyl sulfide. The catalyst in the second reactor effects substantially complete decomposition of the carbonyl sulfide to carbon disulfide.

In the preferred embodiment the effluent flue gas is pretreated to remove particulate matter such as fly ash and an acceptor process is used to remove the sulfur dioxide from the flue gas. The sulfur dioxide is successively reduced in a first and second reduction reactor to carbon disulfide.

The following reactions are promoted in the first reduction reactor:

$$2CO + SO_2 \rightarrow \tfrac{1}{2}S_2 + 2CO_2 \qquad (I)$$

$$CO + \tfrac{1}{2}S_2 \rightarrow COS \qquad (II)$$

with carbonyl sulfide (COS) and elemental sulfur (S) both produced using carbon monoxide as a reductant. The carbonyl sulfide is toxic and cannot be vented to the atmosphere. However, in the present process the formation of the COS is substantially maximized with the substantially complete reduction of the sulfur dioxide.

The following reactions occur in the second reduction reactor:

$$2COS \rightarrow CS_2 + CO_2 \qquad (III)$$

$$COS \rightarrow CO + \tfrac{1}{2}S_2 \qquad (IV)$$

with reaction III maximized.

In the first reactor, a catalyst containing a reducible metal oxide which is active promoting reactions I and II is preferred, such as a chromium promoted iron catalyst, although other metal promoted catalysts may be used, such as nickel-molybdenum, cobalt-molybdenum, molybdenum, or any combination thereof. It is important in the second reactor that only equation III be promoted and equations II and IV be avoided. In the second reactor a single function acid catalyst, such as active alumina may be used, although other catalysts such as silica-alumina or faujasite may also be used.

To effect substantially complete reduction of the sulfur dioxide to carbon disulfide, the feed to the second reactor is preferably sulfur dioxide free.

The sulfur dioxide stream leaving the acceptor process and entering the first reduction reactor reacts with carbon monoxide, introduced as a reducing gas, to produce carbonyl sulfide. Some sulfur may also be produced, but the major reaction is the carbonyl sulfide formation. The carbonyl sulfide generated in the first reduction reactor enters the second reduction reactor where the carbon disulfide is formed.

The primary purpose of the first reactor is to react a concentrated sulfur dioxide stream with carbon monoxide to generate carbonyl sulfide. Carbon monoxide is added on the basis of the stoichiometric requirement for the total sulfur dioxide present in the first reactor. In determining the amount of carbon monoxide to be used as a reducing stream, a carbon monoxide ratio is defined as follows: the carbon monoxide ratio equals carbon monoxide concentration divided by two times the sulfur dioxide introduced into the first reactor. Preferably, 60–90%, generally 99+%, sulfur dioxide is converted to carbonyl sulfide. The sulfur dioxide not converted to carbonyl sulfide reduces to elemental sulfur. Production of the carbonyl sulfide is controlled by adjusting the ratio of carbon monoxide to sulfur dioxide. Lower carbon monoxide ratios result in less carbonyl sulfide production. Preferably, the design criteria for the first reduction reactor is to convert all entering sulfur dioxide to carbonyl sulfide before it enters the second reactor. A carbon monoxide ratio of 1.5 would be stoichiometrically required to react sulfur dioxide and carbon monoxide entirely to carbonyl sulfide. This would eliminate the need for removing carbon monoxide, normally a pollutant, from the effluent gas stream if all sulfur dioxide is reacted to carbonyl sulfide.

The primary purpose of the second reactor is to promote equation III. The carbonyl sulfide enters the second reactor where the carbonyl sulfide decomposes to carbon disulfide and carbon dioxide.

BRIEF DESCRIPTION OF THE DRAWING

The drawing is a process flow diagram of an embodiment of the invention.

DESCRIPTION OF THE PREFERRED EMBODIMENT

In the present invention, carbon disulfide is provided as the product of stack gas clean-up. Initially, sulfur dioxide is removed from a flue gas, whic step is well known and need not be described in detail. See Schneider et al., "Application of the Wellman-Lord $SO_2$ Process to Stack Gas Desulfurization" Flue Gas Desulfurization Symposium, New Orleans, May 1973. Therefore, the removal of the sulfur dioxide from the flue gas for further treatment is represented schematically at 10. Initially, the flue gas is scrubbed with a sodium sulfite solution in a liquid gas contacting unit. The solution containing sodium bisulfite as well as unreacted sodium sulfite and by-product sodium bisulfate, is circulated to an evaporative crystallizer, where a regeneration step occurs. The flue gas passes directly to the stack. Regenerated sodium sulfite is recycled through a dissolving tank back to the scrubber. A gaseous stream of water and sulfur dioxide is produced in the regenerator. This stream is cooled to condense the water, which is recycled to dissolve the sodium sulfite. The now concentrated sulfur dioxide stream is available for treatment and flows to the compressor 12.

The effluent from 10 is a stream of water vapor and sulfur dioxide. This stream as introduced for processing contains about 10 mole percent water vapor at 120° F. This illustrative example will be described based on a 100 million standard cubic feet per hour of flue gas containing about 2,000 ppm sulfur dioxide, approximately 620 lb. mole per hour (37,000 lb. per hour) of the 90 mole percent sulfur dioxide stream to be treated.

The concentrated sulfur dioxide stream from the regenerator 10 is first compressed in a multiple stage centrifugal compressor 12 from atmospheric to 60 psia. The compressed stream passes through a heat exchanger 14 where the temperature of the stream is lowered from approximately 400° F. at the end of the compression step to 85° F. In this cooling step, water is condensed and the composition of the stream flowing from the heat exchanger 14 is greater than 99% sulfur dioxide and less than 1% water.

The stream is blended with a stream comprising carbon monoxide but substantially hydrogen free, producing a stream at 85° F., approximately 45 psia, which is fed to a heater 16, where the temperature is raised to between 500°–900° F., preferably between about 600°–800° F., say for example 650° F.

Carbon monoxide is added on the basis of the stoichiometric requirement for the total sulfur dioxide present in the main stream. Depending upon temperature and space velocities, the carbon monoxide added is between a ratio of 1.5 to 2.0, preferably between a ratio of 1.5 to 1.7. For example, the carbon monoxide ratio is 1.5, and, hence, to the approximately 560 lb. mole per hour sulfur dioxide received from the regenerator 10, 1120 lb. moles per hour carbon monoxide must be added, or approximately 40,000 SCFH. This ratio provides a minimum value for complete carbonyl sulfide production. Nitrogen may also be added in the same amount as the carbon monoxide. The nitrogen provides only dilution and the amount required is abitrary. WIth nitrogen added, the process stream is composed of about 14.2% sulfur dioxide, 42.8% each of carbon monoxide and nitrogen, and about 0.14% water. The process stream is split equally downstream of heater 16 to be processed in two parallel trains of which only one is shown in FIG. 1. An $SO_2$ concentration of from 5–33% sulfur dioxide may be processed.

This split stream is introduced into a first reduction reactor 18 where the carbon monoxide reduction of sulfur dioxide to carbonyl sulfide is promoted by a chromium-containing iron catalyst such as available from the Girdler Corporation and identified as G-3A. The reactor 18 is essentially a steam generating heat exchanger. The heat of reaction necessitates removal of 23.4 mm BTU per hour in each train where the discharge temperature is to be 650° F. The catalyst is disposed inside the tubes (not shown) of the reactor using an 8,000 sq.ft. exchanger with generation of 500° F. steam (680 psi). With 1¼ inches outside diameter tubes 8 ft in length, the exchanger can hold slightly over 140 cubic feet of catalyst corresponding to a space velocity of 5500 hr$^{-1}$. The pressure drop to the beds is on the order of 17–20 psi with ⅛ inch catalyst pellets. The space velocity may for each reactor 22 range between 500 to 60,000 hr$^{-1}$, preferably between about 2500 to 15,000 hr$^{-1}$.

The effluent from the first reduction reactor 18, both parallel trains, comprising about 15.2% carbonyl sulfide, trace amounts of sulfur dioxide and hydrogen sulfide and the remainder carbon dioxide and nitrogen at a temperature between 400°–800° F. and preferably between 600°–750° F., say for example 700° F., and at approximately 20 psia enters a second reduction reactor 20. Preferably blended with this stream is recycled carbonyl sulfide from the condensor 22. Once equilibrium for the process is reached the recycled carbonyl sulfide plus the carbonyl sulfide from the first reactor 18 will comprise 28% of the influent stream.

The second reduction reactor 20 is a simple downflow fixed bed converter containing active alumina. For each foot of catalyst depth, approximately 40 cubic feet of catalyst volume is contained and a pressure drop of 1.1 psi is incurred. A 1-foot catalyst depth corresponds to space velocity of 24,000 hr$^{-1}$. Obviously, smaller shells would result in deeper beds and higher pressure drops for a given space velocity. The space velocity through the second reactor 20 is within the same range as for the combined first reactors 18 (one for each parallel train). Equation III is promoted in the reactor 20. The carbon disulfide yield, defined as the percent feed of carbonyl sulfide converted to carbon disulfide is limited by equilibrium to 35%. The presence of sulfur dioxide in the second reactor would adversely affect this yield.

The carbon disulfide containing effluent from the second reduction reactor 20 comprising about 5% carbon disulfide and 10% carbonyl sulfide and at about 700° F. is cooled and the carbon disulfide condensed in a condenser 22. The condenser's total duty is 11.8 mm BTU per hour including the sensible heat of the stream and the condensation of elemental carbon disulfide. Preferably, recycle of the effluent is effected first by absorption in an aromatic solvent such as kerosene or benzene to remove sulfur dioxide and carbon dioxide. The non-decomposed carbonyl sulfide then enters the reactor 20 to be reprocessed.

Other catalysts which may be used for the first reduction reactor are cobalt-molybdenum, nickel-molybdenum, molybdenum, or combinations thereof, at temperatures between 500°–900° F. and space velocities between 500 to 50,000 $hr^{-1}$, preferably between 600°–800° F. and 2500 to 15,000 $hr^{-1}$. Other catalysts which may be used for the second reduction reactor are silica-alumina or faujasite, at temperatures between 400°–800° F. and space velocities between 500 and 60,000 $hr^{-1}$, and preferably between 600°–750° F. and 2500 to 15,000 $hr^{-1}$.

The following examples illustrate the suitability of these catalyst compositions for the practice of the invention. As will be apparent to one skilled in the art, the conversion and/or reaction rates set forth in the preferred embodiment may be achieved by controlling operating conditions.

EXAMPLE I

A dry gas stream containing sulfur dioxide, carbon monoxide, and nitrogen was blended from high-pressure cylinders of the pure components. This stream, with a nominal composition of 20% sulfur dioxide, 60% carbon monoxide, and 20% nitrogen, was fed to a tubular reactor. The reactor held a 0.40 gram charge of the catalyst Girdler G-3A, a chromium-promoted (6% Cr) iron-oxide (78% $Fe_2O_3$) catalyst. With flow rates of reactants to give the equivalent space velocities listed below, very high conversions of sulfur dioxide to carbonyl sulfide were obtained, as shown in the following table:

TABLE I

| Space Velocity ($hr^{-1}$) | Temperature (° F) | Fractional Conversion $SO_2$ | Fractional Yield COS |
|---|---|---|---|
| 4,500 | 628 | 0.90 | 0.90 |
| 5,300 | 633 | 0.99+ | 0.99+ |
| 30,000 | 780 | 0.99+ | 0.99+ |
| 52,000 | 790 | 0.93 | 0.93 |
| 60,000 | 815 | 0.99 | 0.99 |

EXAMPLE II

A dry gas stream containing sulfur dioxide, carbon monoxide, and nitrogen was blended from high-pressure cylinders of the pure components. This stream, with a nominal composition of 20% sulfur dioxide, 60% carbon monoxide, and 20% nitrogen, was fed to a tubular reactor. The reactor held a 0.40 gram charge of the catalyst Harshaw HT-400, a cobalt (3% CoO)-molybdenum (17% $MoO_3$) catalyst. With flow rates of reactants to give a space velocity equivalent to 4000 reciprocal hours, very high conversions of sulfur dioxide to carbonyl sulfide were obtained, as shown in the following table.

TABLE II

| Temperature (° F) | Fractional Conversion $SO_2$ | Fractional Yield COS |
|---|---|---|
| 665 | 0.50 | 0.50 |
| 680 | 0.70 | 0.60 |

EXAMPLE III

A dry gas stream containing sulfur dioxide, carbon monoxide, and nitrogen is blended from high-pressure cylinders of the pure components. This stream, with a nominal composition of 20% sulfur dioxide, 60% carbon monoxide, and 20% nitrogen, is fed to a tubular reactor. The reactor holds a 0.40 gram charge of the catalyst Harshaw HT-100, a nickel (4% NiO)-molybdenum (17% $MoO_3$) catalyst. With flow rates of reactants to give a space velocity equivalent to 4000 reciprocal hours, very high conversions of sulfur dioxide to carbonyl sulfide are obtained, as shown in the following table.

TABLE III

| Temperature (° F) | Fractional Conversion $SO_2$ | Fractional Yield COS |
|---|---|---|
| 725 | 0.90 | 0.80 |

EXAMPLE IV

A dry gas stream containing carbonyl sulfide and nitrogen was blended from high-pressure cylinders of the pure components. This stream with a nominal composition of 32% carbonyl sulfide and 68% nitrogen was fed to a tubular reactor. The reactor held a 1.13 gram charge of the catalyst Kaiser KA-201, an alumina (94% $Al_2O_3$) catalyst. With flow rates of reactants to give space velocities equivalent to those listed below, very high conversions of carbonyl sulfide to carbon disulfide were obtained, as shown in the following table:

TABLE IV

| Temp. | Space Velocity ($hr^{-1}$) | Fractional Conversion COS | Fractional Yield $CS_2$ | $CS_2$ Yield as % of Equil. Yield |
|---|---|---|---|---|
| 610 | 1500 | 0.35 | 0.35 | 99+% |
| 610 | 7000 | 0.33 | 0.33 | 94% |
| 720 | 16,000 | 0.35 | 0.35 | 99+% |
| 720 | 25,000 | 0.34 | 0.34 | 97% |

NOTE: The terms "Fractional Conversion" and "Fractional Yield" are based on the total sulfur dioxide introduced into the reactor as used in Tables I, II and III. The terms "Fractional Conversion COS" and "Fractional Yield $CS_2$" as used in Table IV are based on the total COS introduced into the reactor.

Having described our invention, what we now claim is:

1. A method for the production of carbon disulfide from sulfur dioxide removed from a gaseous effluent which includes:
   (a) removing sulfur dioxide as a stream from a flue gas;

(b) compressing the stream of step (a) and subsequently removing water from said stream;

(c) blending carbon monoxide and nitrogen with the stream of step (b); the sulfur dioxide in the stream being between about 5–33%;

(d) introducing the stream of step (c) which consists essentially of nitrogen, carbon monoxide and sulfur dioxide at a temperature between about 500° F. to 900° F. into a first reduction reactor containing a chromium-promoted iron oxide catalyst;

(e) reducing between 60 to 99+% of the sulfur dioxide to carbonyl sulfide, the remainder being reduced to sulfur;

(f) discharging a stream from the first reduction reactor, which stream consists essentially of carbonyl sulfide, sulfur, nitrogen and carbon dioxide;

(g) introducing the stream of step (f) into a second reduction reactor which contains a catalysts of the group consisting of silica-alumina, faujasties and active alumina to decompose a portion of the carbonyl sulfide to form carbon disulfide at a temperature between about 400° F. to 800° F.; and (h) recovering the carbon disulfide formed.

2. The method of claim 1 which includes blending the carbon monoxide in an amount sufficient to reduce 99+% of the sulfur dioxide to carbonyl sulfide and wherein the stream entering the second reduction reactor consists essentially of carbonyl sulfide, carbon dioxide and nitrogen.

3. The method of claim 1 which includes introducing the main stream at a space velocity of between 500 to 60,000 hr$^{-1}$ into the first reduction reactor; and introducing the blended stream at a space velocity of 500 to 60,000 hr$^{-1}$ into the second reduction reactor.

4. The method of claim 1 wherein the catalyst in the second reduction reactor is active alumina.

* * * * *